United States Patent
Kim et al.

(10) Patent No.: US 7,439,644 B2
(45) Date of Patent: Oct. 21, 2008

(54) HYBRID INDUCTION MOTOR

(75) Inventors: Jeong-Chul Kim, Gyeonggi-Do (KR); Dong-Il Lee, Gyeonggi-Do (KR); Seung-Do Han, Incheon (KR); Hyoun-Jeong Shin, Incheon (KR); Jae-Hong Ahn, Gyeonggi-Do (KR); Seung-Suk Oh, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 205 days.

(21) Appl. No.: 11/325,301

(22) Filed: Jan. 5, 2006

(65) Prior Publication Data

US 2006/0226722 A1    Oct. 12, 2006

(30) Foreign Application Priority Data

Apr. 11, 2005  (KR) .................. 10-2005-0030075

(51) Int. Cl.
    *H02K 16/02*    (2006.01)
    *H02K 17/02*    (2006.01)
(52) U.S. Cl. .................. 310/166; 310/114; 310/126; 310/156.25; 310/266
(58) Field of Classification Search .......... 310/116, 310/114, 226, 126, 156.25, 166, 266
    See application file for complete search history.

(56) References Cited

U.S. PATENT DOCUMENTS

| | | | | | |
|---|---|---|---|---|---|
| 1,227,185 | A | * | 5/1917 | Neuland | 310/105 |
| 2,864,017 | A | * | 12/1958 | Waltscheff | 310/126 |
| 3,515,918 | A | * | 6/1970 | Otto | 310/90 |
| 3,614,494 | A | * | 10/1971 | Borchers et al. | 310/56 |
| 4,375,047 | A | * | 2/1983 | Nelson et al. | 318/48 |
| 5,675,203 | A | * | 10/1997 | Schulze et al. | 310/113 |
| 6,367,326 | B1 | * | 4/2002 | Okada | 73/504.12 |
| 6,380,653 | B1 | * | 4/2002 | Seguchi | 310/112 |
| 6,462,430 | B1 | | 10/2002 | Joong et al. | |
| 6,700,272 | B1 | | 3/2004 | Lindner et al. | |
| 6,794,781 | B2 | * | 9/2004 | Razzell et al. | 310/114 |
| 6,833,646 | B2 | * | 12/2004 | Joong et al. | 310/114 |
| 2004/0189128 | A1 | * | 9/2004 | Joong et al. | 310/152 |
| 2006/0131984 | A1 | | 6/2006 | Han et al. | |

(Continued)

FOREIGN PATENT DOCUMENTS

DE    1 9821632    11/1999

(Continued)

OTHER PUBLICATIONS

U.S. Appl. No. 11/325,503 to Lee et al., filed Jan. 5, 2006.

(Continued)

*Primary Examiner*—Burton Mullins
(74) *Attorney, Agent, or Firm*—Greenblum & Bernstein, P.L.C.

(57) ABSTRACT

A hybrid induction motor comprises a stator fixedly installed in a casing, an induction rotor rotatably inserted into a center of the stator and having a shaft at a center thereof, a first synchronous rotor installed between the stator and the induction rotor in a circumferential direction of the shaft so as to be freely rotatable, and a second synchronous rotor facing the first synchronous rotor in a longitudinal direction of the shaft and installed between the stator and the induction rotor so as to be freely rotatable.

9 Claims, 7 Drawing Sheets

U.S. PATENT DOCUMENTS

2006/0175924 A1 * 8/2006 Han et al. .................. 310/166
2006/0226722 A1 * 10/2006 Kim et al. .................. 310/114

FOREIGN PATENT DOCUMENTS

| DE | 19821632 | 11/1999 |
| EP | 1085644 | 3/2001 |
| EP | 1675250 | 6/2006 |

OTHER PUBLICATIONS

U.S. Appl. No. 11/275,257 to Han et al., filed Dec. 21, 2005.
English language Abstract of DE 19821632, Nov. 18, 1999.

* cited by examiner

HYBRID INDUCTION MOTOR

BACKGROUND OF THE INVENTION

1. Field of the Invention

The present invention relates to a hybrid induction motor, and more particularly, to a hybrid induction motor capable of improving a starting function and facilitating to implement a variable speed rotation.

2. Description of the Background Art

A hybrid induction motor refers to a motor in which a permanent magnet (hereinafter, will be referred to as a 'synchronous rotor') is installed between a stator and an induction rotor so as to be freely rotatable and thus to be electromagnetically coupled thereto.

FIG. 1 is a longitudinal section view showing a hybrid induction motor in accordance with the conventional art, and FIG. 2 is a sectional view taken along line I-I of FIG. 1.

As shown, in a conventional hybrid induction motor 10, a stator 11 is fixedly-disposed at an inner side of a casing 10a, and a synchronous rotor 14 is rotatably disposed at an inner side of the stator 11 with a certain gap. An induction rotor 13 is rotatably disposed at an inner side of the synchronous rotor 14 with a certain gap. Also, a rotation shaft 15 for outputting a rotation force of the induction rotor 13 outwardly is press-fit into a center of the induction rotor 13.

The stator 11 is formed of a laminated silicon steel, and a plurality of slots 16a for winding a driving coil 16 that generates a rotating magnetic field are formed at an inner circumferential surface of the stator 11.

The synchronous rotor 14 comprises a magnet portion 14a freely rotatable between the stator 11 and the induction rotor 13, a magnet support portion 14b for supporting the magnet portion 14a, and a bearing portion 14c for supporting the magnet support portion 14b to freely rotate the rotation shaft 15.

The induction rotor 13 is formed as a squirrel cage rotor comprising a plurality of through holes 13a formed at a laminated silicon steel with a certain gap, conductive bars 13a inserted into each through hole 13a, and end rings 13c formed at both ends of each conductive bar 13b. An unexplained reference numeral 15a denotes a shaft bearing.

An operation of the conventional hybrid induction motor will be explained.

Once a rotating magnetic field is formed as a first current is sequentially applied to the driving coil 16 of the stator 11, the synchronous rotor 14 is synchronized by the rotating magnetic field thereby to be rotated at a synchronous speed. A magnetic flux generated from the magnet portion 14a of the synchronous rotor 14 serves as a rotating magnetic field of the induction rotor 13, so that the induction rotor 13 is rotated with it being slip.

Herein, the rotation shaft 15 coupled to the induction rotor 13 is rotated together with the induction rotor 13 thereby to transmit a rotation force to other components such as a fan.

However, in the conventional hybrid induction motor 10, a single synchronous rotor is implemented under a state that a magnetic flux density of an air gap between the induction rotor and the synchronous rotor is almost constant. Therefore, a starting torque of the synchronous rotor 14 is not sufficient, and thus a great current has to be applied to the driving coil 16 at the time of an initial driving of the induction motor.

Furthermore, even if a voltage applied to the driving coil 16 is varied, a varied amount of the magnetic flux density of the air gap is less thereby to have a difficulty in speed-varying the induction motor. Accordingly, an efficiency of the motor is degraded and the motor has limited functions.

BRIEF DESCRIPTION OF THE INVENTION

Therefore, an object of the present invention is to provide a hybrid induction motor capable of enhancing an efficiency thereof by lowering a starting current of a synchronous rotor.

Another object of the present invention is to provide a hybrid induction motor capable of easily varying a rotation speed of an induction rotor.

Still another object of the present invention is to provide a hybrid induction motor capable of reducing noise by preventing vibration generated at the time of synchronizing first and second synchronous rotors.

To achieve these and other advantages and in accordance with the purpose of the present invention, as embodied and broadly described herein, there is provided a hybrid induction motor, comprising: a stator fixedly installed in a casing; an induction rotor rotatably inserted into a center of the stator and having a shaft at a center thereof; a first synchronous rotor slid in a longitudinal direction of the shaft between the stator and the induction rotor and installed in a circumferential direction of the shaft so as to be freely rotatable; and a second synchronous rotor facing the first synchronous rotor, slid in a longitudinal direction of the shaft between the stator and the induction rotor, and installed in a circumferential direction of the shaft so as to be freely rotatable.

The first synchronous rotor comprises a first support portion to a center thereof a shaft is rotatably coupled, a first magnet portion coupled to an end of the first support portion in a circumferential direction and rotated by a rotating magnetic field of the stator for rotating the induction rotor, and a first bearing portion disposed at the center of the first support portion for inserting the shaft.

The second synchronous rotor comprises a second support portion to a center thereof a shaft is rotatably coupled, a second magnet portion coupled to an end of the second support portion in a circumferential direction and rotated by a rotating magnetic field of the stator for rotating the induction rotor, and a second bearing portion disposed at the center of the second support portion for inserting the shaft.

The first bearing portion is an oilless bearing, the first support portion is a non-magnetic substance, the second bearing portion is an oilless bearing, and the second support portion is a non-magnetic substance.

The first support portion and the first magnet portion are integrally formed, and the second support portion and the second magnet portion are integrally formed.

A length of the first magnet portion in a shaft longitudinal direction is relatively longer than a length of the second magnet portion in a shaft longitudinal direction.

Preferably, a non-magnetic stopper is installed at the shaft so as to have a certain gap between an end of the first magnet portion and an end of the second magnet portion.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

Hereinafter, a hybrid induction motor according to the present invention will be explained with reference to the attached drawings.

Figure 1:
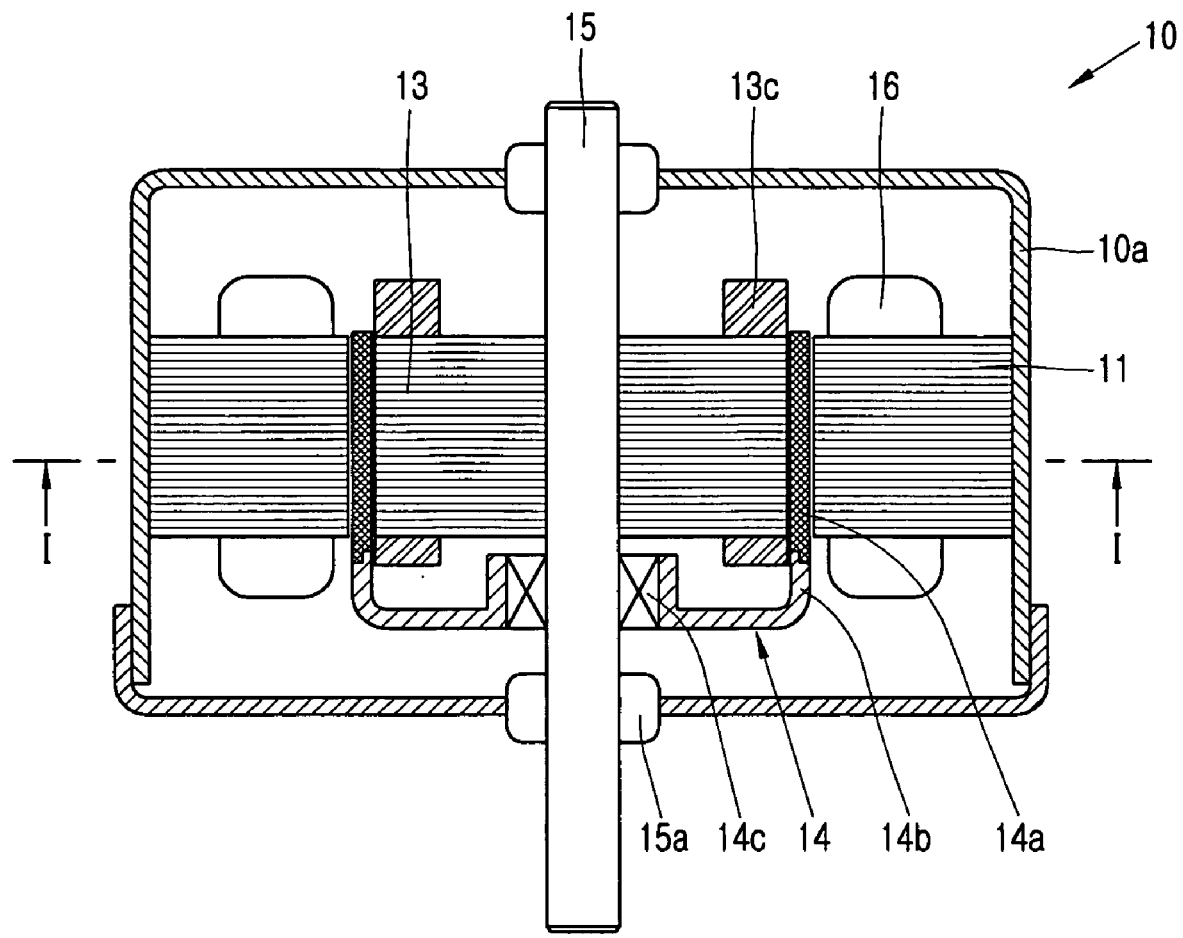
FIG. 1 is a longitudinal section view showing a hybrid induction motor in accordance with the conventional art.
Figure 2:
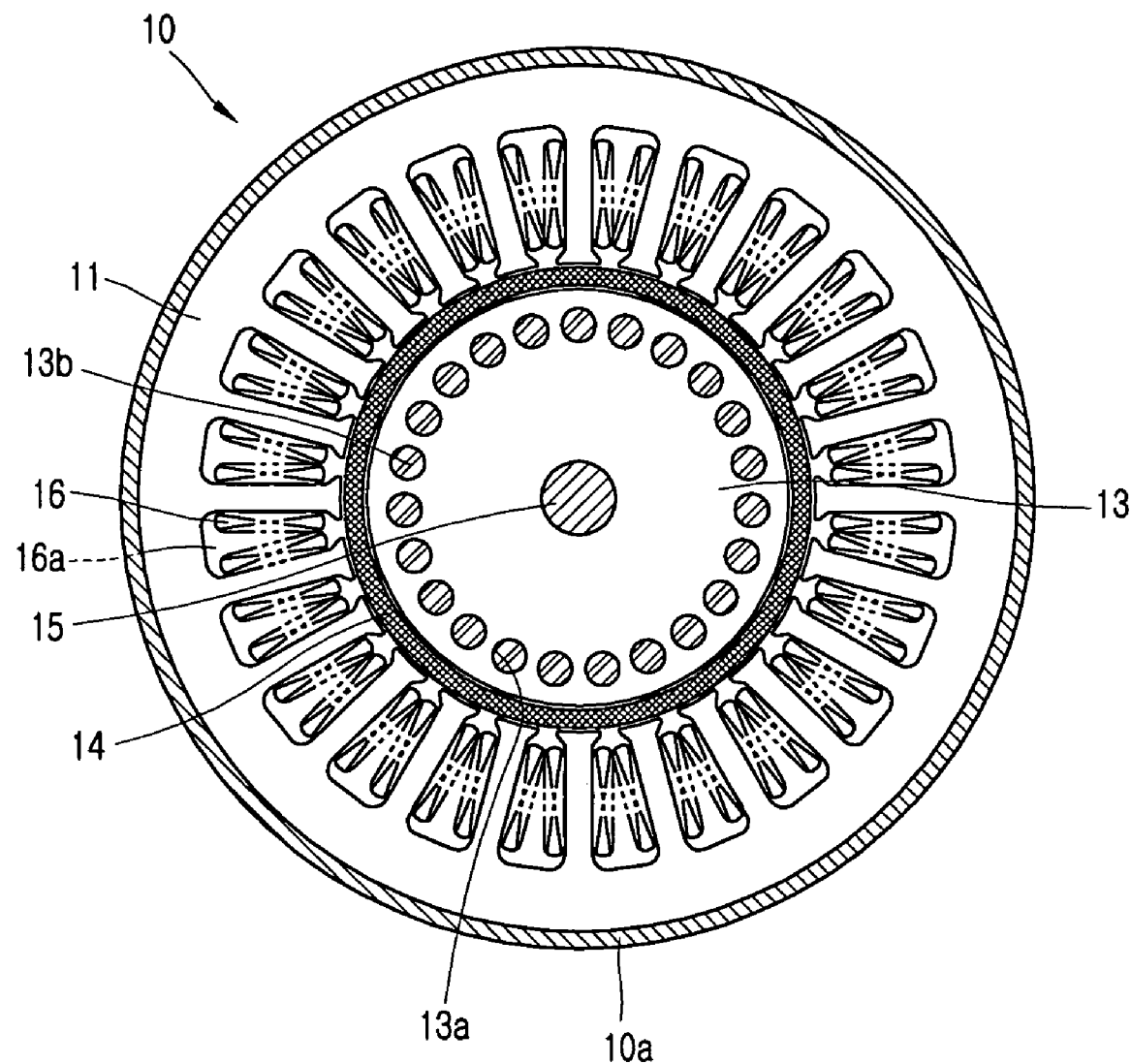
FIG. 2 is a sectional view taken along line I-I of FIG. 1.
Figure 3:
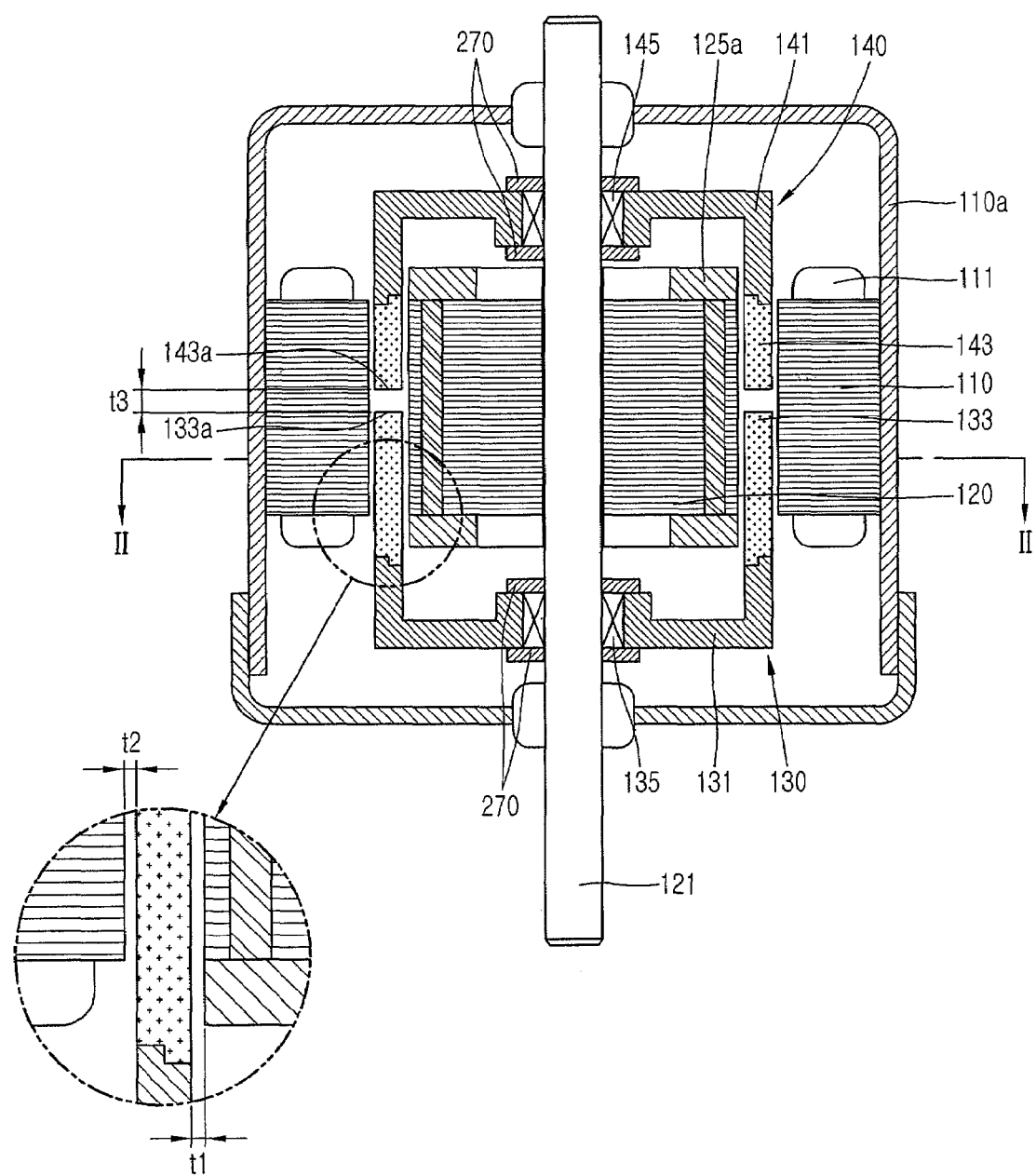
FIG. 3 is a longitudinal section view showing a hybrid induction motor according to a first embodiment of the present invention.
Figure 4:
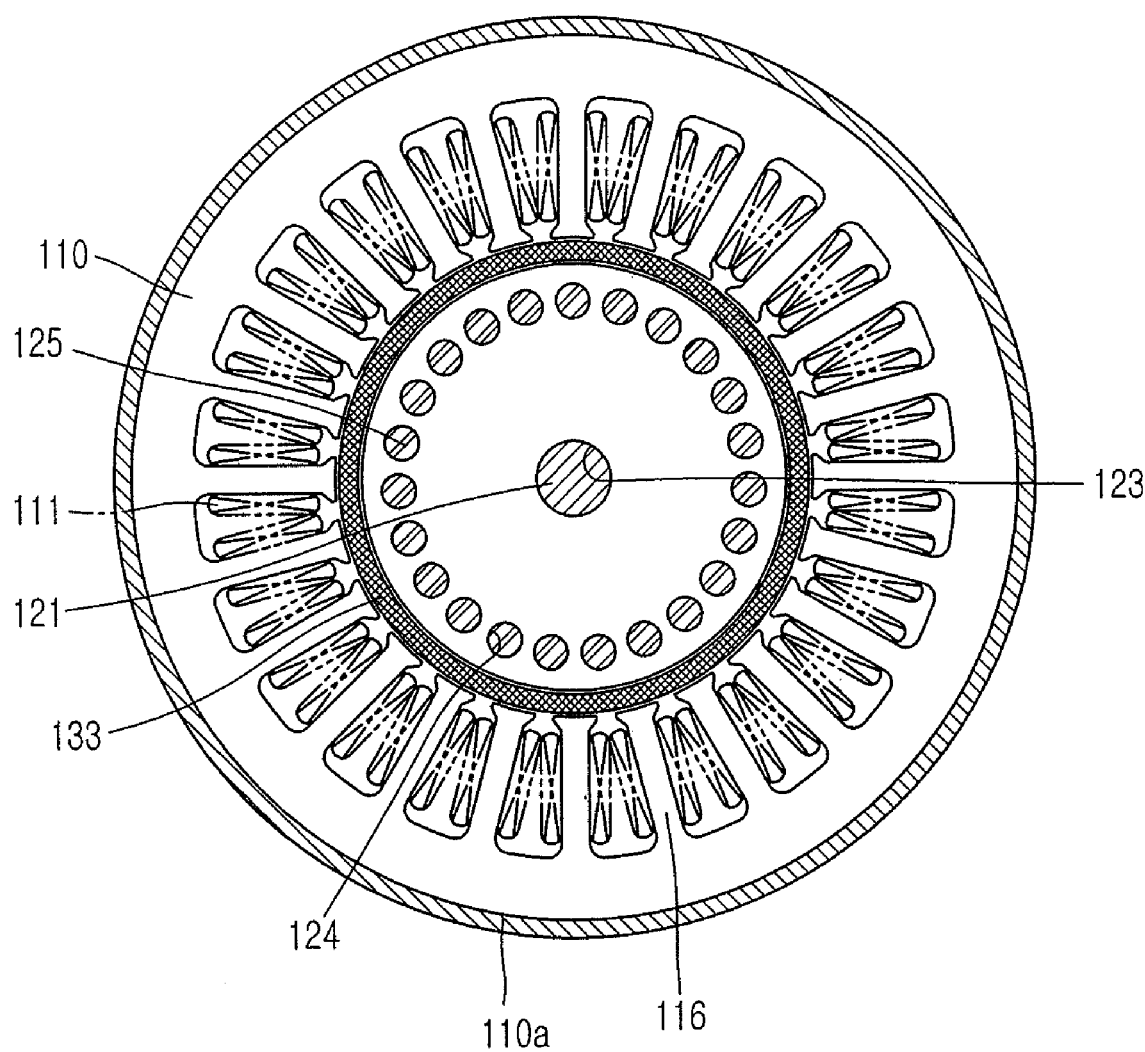
FIG. 4 is a sectional view taken along line II-II of FIG. 3.
Figure 5:
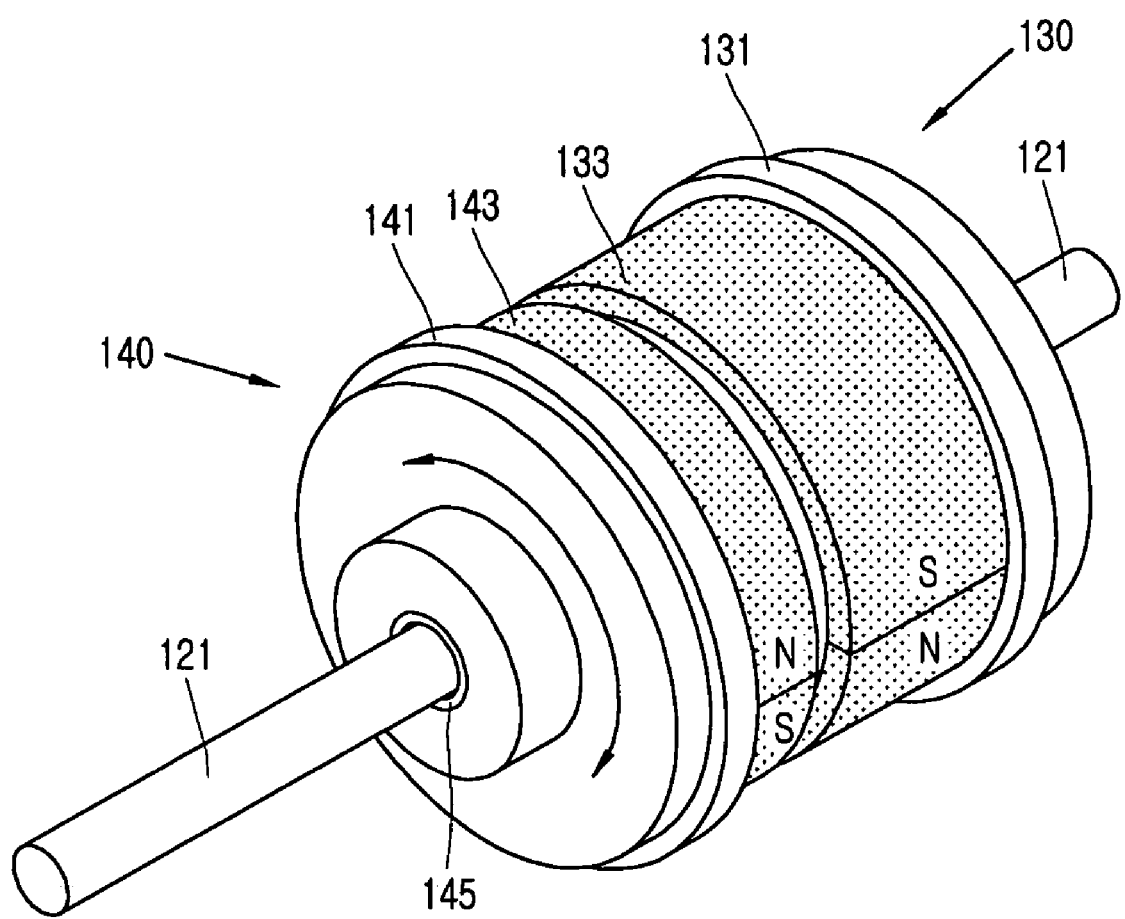
FIG. 5 is a perspective view showing a synchronous rotor and an induction rotor in the hybrid induction motor according to a first embodiment of the present invention.
Figure 6:
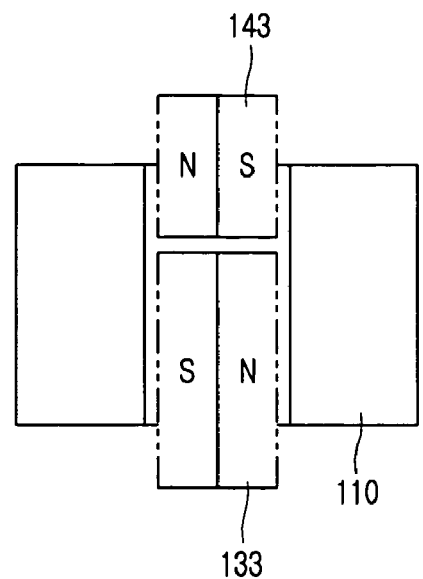
FIGS. 6 to 8 are schematic views showing each position of a first synchronous rotor and a second synchronous rotor at the time of starting and speed-varying the hybrid induction motor according to a first embodiment of the present invention.
Figure 7:
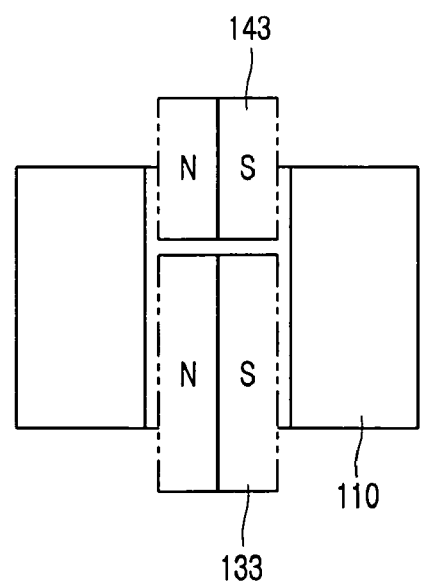
Figure 8:
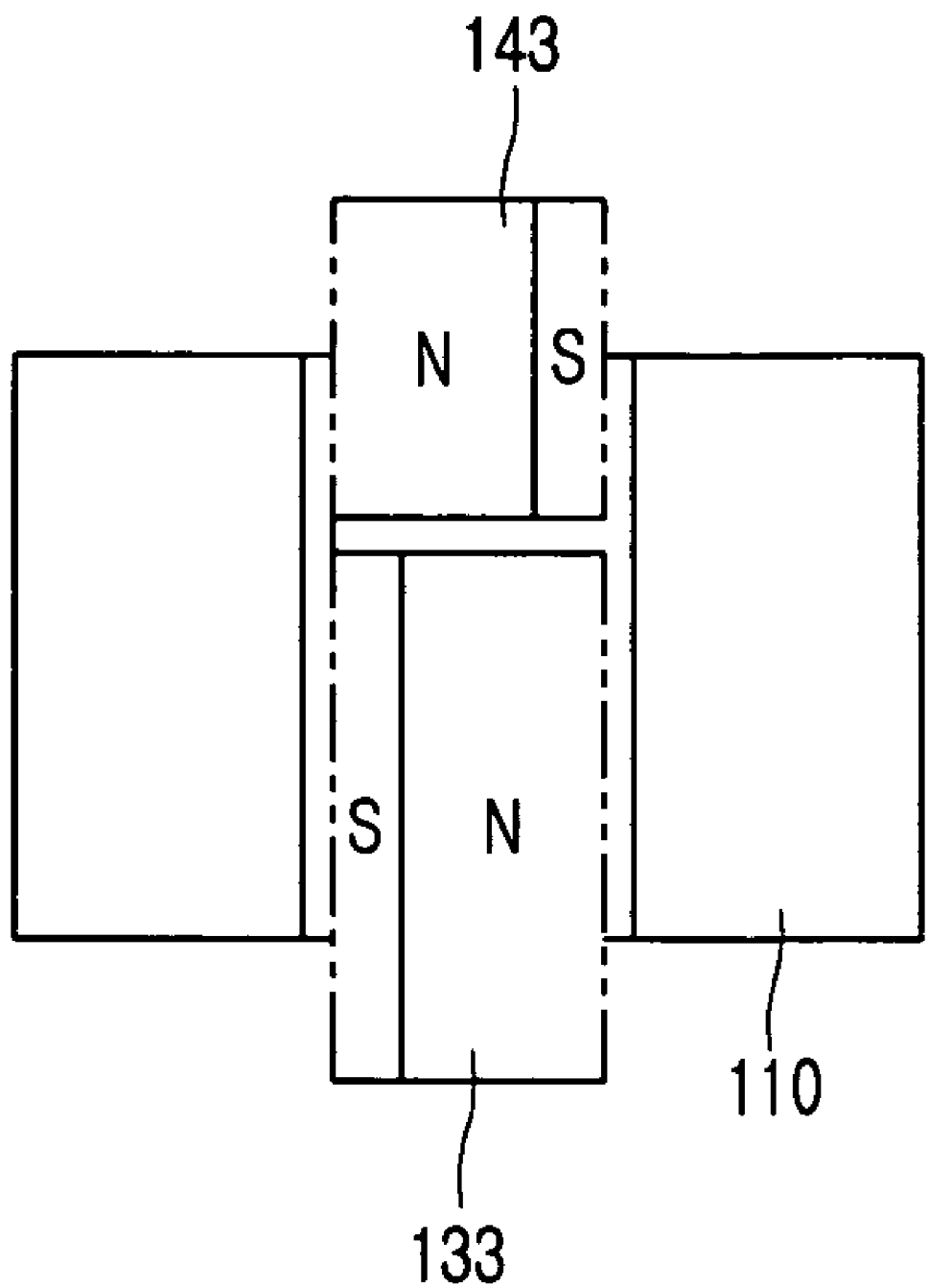

FIG. 3 is a longitudinal section view showing a hybrid induction motor according to a first embodiment of the present invention, FIG. 4 is a sectional view taken along line II-II of FIG. 3, FIG. 5 is a perspective view showing a synchronous rotor and an induction rotor in the hybrid induction motor according to a first embodiment of the present invention, and FIGS. 6 to 8 are schematic views showing each position of a first synchronous rotor and a second synchronous rotor at the time of starting and speed-varying the hybrid induction motor according to a first embodiment of the present invention.

As shown, a hybrid induction motor according to a first embodiment of the present invention comprises a stator 110 fixedly installed in a casing 110a, an induction rotor 120 rotatably inserted into a center of the stator 110 and having a shaft 121 at a center thereof, a first synchronous rotor 130 free-rotatably installed between the stator 110 and the induction rotor 120 in a circumferential direction of the shaft 121, and a second synchronous rotor 140 facing the first synchronous rotor 130 and free-rotatably installed between the stator 110 and the induction rotor 120 in a circumferential direction of the shaft 121.

A coil winding portion 116 for winding a driving coil 111 of the stator 110 so that the stator 110 can have a polarity of an N pole or an S pole is formed at one side of the stator 110.

A hole 123 for inserting the shaft 121 is formed at a center of the induction rotor 120, and a plurality of conductive holes 124 are formed at an outer periphery portion of the induction rotor 120 with the same interval in a circumferential direction. A conductive bar 125 is installed at the conductive hole 124.

The conductive bar 125 is formed by a die casting, and is formed of aluminum or copper. An end ring 125a formed of aluminum is formed at the end of the conductive bar 125.

The first synchronous rotor 130 comprises a first support portion 131 to a center thereof the shaft 121 is rotatably coupled, a first magnet portion 133 having a cylindrical shape and coupled to the end of the first support portion 131 in a circumferential direction thus to be rotated by a rotating magnetic field of the stator 110 for rotating the induction rotor 120, and a first bearing portion 135 disposed at the center of the first support portion 131 for inserting the shaft 121.

The second synchronous rotor 140 comprises a second support portion 141 to a center thereof the shaft 121 is rotatably coupled, a second magnet portion 143 having a cylindrical shape and coupled to the end of the second support portion 141 in a circumferential direction thus to be rotated by a rotating magnetic field of the stator 110 for rotating the induction rotor 120, and a second bearing portion 145 disposed at the center of the second support portion 141 for inserting the shaft 121.

The first magnet portion 133 and the second magnet portion 143 are respectively constructed to have a plurality of poles. The first magnet portion 133 and the second magnet portion 143 are respectively mounted in a radial direction. An N pole and an S pole are alternately formed at the first magnet portion 133 and the second magnet portion along each circumferential direction.

A length of the shaft 121 of the first magnet portion 133 in a longitudinal direction is relatively longer than a length of the shaft 121 of the second magnet portion 143 in a longitudinal direction.

The first support portion 131 and the first magnet portion 133 are integrally formed by a molding, and the second support portion 141 and the second magnet portion 143 are integrally formed by a molding.

Preferably, the first bearing portion 135 and the second bearing portion 145 are respectively formed of an oilless bearing so that the shaft 121 can be smoothly rotated.

A plurality of stoppers 270 are installed at the shaft 121 so that the end of the first magnet portion 133 and the end of the second magnet portion 143 can have a certain gap therebetween. More specifically, two stoppers 270 are positioned at both sides of the first synchronous rotor 130, other two stoppers 270 are positioned at both sides of the second synchronous rotor 140. Due to each stopper 270, the first synchronous rotor 130 and the second synchronous rotor 140 are restricted from sliding in a longitudinal direction of the shaft 121 but are rotated only in a circumferential direction of the shaft 121.

Preferably, the stoppers 270 are non-magnetic substances so as not to influence magnetic flux.

When the first synchronous rotor 130 and the second synchronous rotor 140 are synchronized, vibration can be generated in the shaft_direction. However, the stoppers 270 prevent the vibration from being generated thereby to reduce noise.

A first air gap (t1) is formed between the first synchronous rotor 130 and the stator 11, and a second air gap (t2) is formed between the first synchronous rotors 130 and the induction rotor 120. A third air gap (t3) is formed between the first synchronous rotor 130 and the second synchronous rotor 140.

Hereinafter, an operation of the hybrid induction motor according to the first embodiment of the present invention will be explained with reference to FIGS. 3 to 8.

Once a rotating magnetic field is formed as a first current is sequentially applied to the driving coil 111 of the stator 110, the first synchronous rotor 130 and the second synchronous rotor 140 are synchronized by the rotating magnetic field thereby to be rotated at a synchronous speed.

A magnetic flux generated from the first magnet portion 133 and the second magnet portion 143 serves as a rotating magnetic field of the induction rotor 120, so that the induction rotor 120 is rotated with it being slip. An output of the motor is transmitted outwardly through the shaft 121 fixed to the induction rotor 120.

Before the first synchronous rotor 130 and the second synchronous rotor 140 are synchronized, the first synchronous rotor 130 and the second synchronous rotor 140 are rotated up to a speed prior to a synchronous speed with a state except states shown in FIGS. 6 and 7 where each pole of the first synchronous rotor 130 and the second synchronous rotor 140 arbitrarily face each other.

When the first synchronous rotor 130 and the second synchronous rotor 140 have been synchronized, a voltage applied to the driving coil 111 is great and thus a magnetic force from the stator 110 is much greater than an attractive force between different poles of the first synchronous rotor 130 and the second synchronous rotor 140. In this case, as shown in FIGS. 6 and 7, the first synchronous rotor 130 and the second synchronous rotor 140 are facing to each other with a state of N-N and S-S or a state of N-S and S-N, and are rotated at a synchronous speed. Herein, the rotating magnetic field formed at each inner side of the first synchronous rotor 130 and the second synchronous rotor 140 becomes maximum, and thus the induction rotor 120 has a maximum rotation speed.

On the contrary, when a voltage applied to the driving coil 111 is less and thus a magnetic force from the stator 110 is not greater than an attractive force between different poles of the first synchronous rotor 130 and the second synchronous rotor 140, the first synchronous rotor 130 and the second synchronous rotor 140 are rotated at a synchronous speed with same poles thereof being overlapped a little. Herein, the rotating magnetic field formed at each inner side of the first synchronous rotor 130 and the second synchronous rotor 140 becomes weak, and thus the induction rotor 120 has a decreased rotation speed.

In the hybrid induction motor according to the first embodiment of the present invention, if the rotating magnetic field generated from the driving coil 111 is weak while a state conversion from FIG. 6 into FIG. 7 is performed, the first synchronous rotor 130 and the second synchronous rotor 140 are alternately synchronized with the rotating magnetic field of the driving coil 111. Accordingly, the number of poles of the first synchronous rotor 130 and the second synchronous rotor 140 is increased by approximately two times. As the result, the rotating magnetic field for rotating the first synchronous rotor 130 and the second synchronous rotor 140 at a synchronous speed can be greatly lowered.

In a process that the first synchronous rotor 130 and the second synchronous rotor 140 are alternately synchronized with the rotating magnetic field of the driving coil 111, if the first synchronous rotor 130 and the second synchronous rotor 140 are not fixed to the shaft 121, the first synchronous rotor 130 and the second synchronous rotor 140 receive a force in a longitudinal direction of the shaft 121 by an attractive force and a repulsive force generated between the first synchronous rotor 130 and the second synchronous rotor 140. Herein, the stopper 270 maintains the air gap (t3) between the first synchronous rotor 130 and the second synchronous rotor 140, thereby preventing vibration and reducing noise.

Furthermore, a starting current is greatly lowered when the hybrid induction motor is initially driven, thereby reducing noise and enhancing an efficiency. Also, a magnetic flux of the synchronous rotor is varied according to a variation of an applied voltage, thereby easily varying a rotation speed of the hybrid induction motor.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A hybrid induction motor, comprising:
    a stator fixedly installed in a casing;
    an induction rotor rotatably inserted into a center of the stator and having a shaft at a center thereof;
    a first synchronous rotor installed between the stator and the induction rotor in a circumferential direction of the shaft so as to be freely rotatable; and
    a second synchronous rotor facing the first synchronous rotor in a longitudinal direction of the shaft and installed between the stator and the induction rotor so as to be freely rotatable,
    wherein the first and second synchronous rotors are restricted from sliding motion in an axial direction.

2. The hybrid induction motor of claim 1, wherein the first synchronous rotor comprises:
    a first support portion to a center thereof a shaft is rotatably coupled;
    a first magnet portion coupled to an end of the first support portion in a circumferential direction and rotated by a rotating magnetic field of the stator, for rotating the induction rotor; and
    a first bearing portion disposed at the center of the first support portion for inserting the shaft, and
    the second synchronous rotor comprises:
    a second support portion to a center thereof a shaft is rotatably coupled;
    a second magnet portion coupled to an end of the second support portion in a circumferential direction and rotated by a rotating magnetic field of the stator, for rotating the induction rotor; and
    a second bearing portion disposed at the center of the second support portion for inserting the shaft.

3. The hybrid induction motor of claim 2, wherein the first bearing portion is an oilless bearing, and the first support portion is a non-magnetic substance.

4. The hybrid induction motor of claim 2, wherein the second bearing portion is an oilless bearing, and the second support portion is a non-magnetic substance.

5. The hybrid induction motor of claim 2, wherein the first support portion and the first magnet portion are integrally formed.

6. The hybrid induction motor of claim 2, wherein the second support portion and the second magnet portion are integrally formed.

7. The hybrid induction motor of claim 2, wherein a length of the first magnet portion in a shaft longitudinal direction is relatively longer than a length of the second magnet portion in a shaft longitudinal direction.

8. The hybrid induction motor of claim 1, wherein a stopper is installed at the shaft so as to have a certain gap between an end of the first magnet portion and an end of the second magnet portion.

9. The hybrid induction motor of claim 2, wherein the stopper is a non-magnetic substance.

* * * * *